(12) United States Patent
Green et al.

(10) Patent No.: US 8,044,291 B2
(45) Date of Patent: Oct. 25, 2011

(54) SELECTION OF VISUALLY DISPLAYED AUDIO DATA FOR EDITING

(75) Inventors: Peter Green, Kirkland, WA (US); James Hart Shafer, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1560 days.

(21) Appl. No.: 11/438,058

(22) Filed: May 18, 2006

(65) Prior Publication Data

US 2007/0287490 A1 Dec. 13, 2007

(51) Int. Cl.
*G10H 1/36* (2006.01)
(52) U.S. Cl. .............. 84/610; 84/609; 84/615; 84/625; 84/649; 84/650; 84/653; 84/660; 84/666
(58) Field of Classification Search ................. None
See application file for complete search history.

(56) References Cited

U.S. PATENT DOCUMENTS

| | | | |
|---|---|---|---|
| 4,868,687 A | 9/1989 | Penn et al. | |
| 5,204,969 A * | 4/1993 | Capps et al. | 704/278 |
| 5,663,517 A * | 9/1997 | Oppenheim | 84/649 |
| 5,792,971 A * | 8/1998 | Timis et al. | 84/609 |
| 7,016,746 B2 * | 3/2006 | Wiser et al. | 700/94 |
| 7,319,185 B1 * | 1/2008 | Wieder | 84/609 |
| 7,363,096 B2 * | 4/2008 | Wiser et al. | 700/94 |
| 7,532,731 B2 * | 5/2009 | Aiso et al. | 381/119 |
| 7,732,697 B1 * | 6/2010 | Wieder | 84/609 |
| 2003/0150319 A1 | 8/2003 | Nishimoto | |
| 2006/0015198 A1 * | 1/2006 | Okabayashi et al. | 700/94 |
| 2007/0261537 A1 * | 11/2007 | Eronen et al. | 84/611 |
| 2010/0131086 A1 * | 5/2010 | Itoyama et al. | 700/94 |

FOREIGN PATENT DOCUMENTS

EP 0322100 6/1989

OTHER PUBLICATIONS

Communication in corresponding European Application No. EP07252032.3 dated Jun. 19, 2008, 4 pages.
Avendano, C., "Frequency-Domain Source Identification and Manipulation in Stereo Mixes for Enhancement, Suppression and Re-panning Applications", 2003, New Paltz, NY.
European Search Report in corresponding European application No. EP07252032 dated Aug. 29, 2007, 2 pages.

* cited by examiner

*Primary Examiner* — Marlo Fletcher
(74) *Attorney, Agent, or Firm* — Fish & Richardson P.C.

(57) ABSTRACT

Methods, systems, and computer program products for selection of visually displayed audio data are provided. In one implementation, a computer-implemented method is provided. Original audio data is displayed in a plurality of visual forms. A first input is received selecting a region within a first visual representation of the original audio data. A second input is received selecting a region within a second visual representation of the original audio data. Audio components from the selected regions are isolated to provide isolated audio data. The isolated audio data corresponds to audio data common to both user selected regions. The isolated audio data is edited and then missed into the original audio data.

18 Claims, 2 Drawing Sheets

SELECTION OF VISUALLY DISPLAYED AUDIO DATA FOR EDITING

BACKGROUND

The present disclosure relates to audio editing.

Different visual representations of audio data are commonly used to display different features of the audio data. For example, visual representations include a frequency spectrogram display shows various frequencies of the audio data in the time-domain (e.g., a graphical display with time on the x-axis and frequency on the y-axis). Similarly, an amplitude display shows audio intensity in the time-domain (e.g., a graphical display with time on the x-axis and intensity on the y-axis).

Audio data can be edited. For example, the audio data may include noise or other unwanted audio data. Removing unwanted audio data improves audio quality (e.g., the removal of noise components provides a clearer audio signal). Alternatively, a user may apply different processing operations to portions of the audio data to generate particular audio effects.

A particular part of the audio data can be uniquely identified by its time, frequency, and pan position. Thus, different audio data having a same time, pan position, and frequency are indistinguishable. In conventional editing systems, however, the user performs edits on the audio data using only one of these parameters with respect to time. For example, the user can isolate and edit a particular frequency of the audio data at a particular time. However, the frequency editing operation will be performed on all instances of that frequency in the audio data over a specified time including all pan positions.

SUMMARY

Methods, systems, and computer program products are provided for selection of visually displayed audio data. In general, in one aspect, a computer-implemented method and computer program product are provided. Original audio data is displayed in a plurality of visual forms. A first selection of a region within a first visual representation of the original audio data is received. A second selection of a region within a second visual representation of the original audio data is received. Audio components from the selected regions are isolated to provide isolated audio data. The isolated audio data corresponds to audio data common to both user selected regions. The isolated audio data is edited and then mixed into the original audio data.

Implementations of the method and computer program product can include one or more of the following features. Displaying the original audio data can include displaying a frequency spectrogram and displaying a pan position graph. Receiving an input selecting a region can include receiving a user input demarcating a region using a selection tool. Isolating audio components can include isolating a portion of the audio data corresponding to each selected region and identifying the audio components common to each isolated portion of the audio data. Isolating audio components can include isolating audio data corresponding to a particular time, frequency, and pan position.

Displaying the original audio data can include receiving a user input selecting one or more visual forms for displaying the original audio data. Editing the isolated audio data can include identifying the isolated audio data for removal from the original audio data. Mixing the edited audio data and the original audio data can include subtracting the isolated audio data from the original audio data.

In general, in one aspect, a system is provided. The system includes means for displaying original audio data in a plurality of visual forms and means for receiving a first selection of a region within a first visual representation of the original audio data. The system also includes means for receiving a second selection of a region within a second visual representation of the original audio data. The system includes means for isolating audio components from the selected regions to provide isolated audio data, the isolated audio data corresponding to audio data common to both user selected regions. The system further includes means for editing the isolated audio data and means for mixing the edited audio data into the original audio data.

In general, in another aspect, a system is provided. The system includes a graphical user interface configured to present a first display region for displaying a first visual representation audio data of an audio file and a second display region for displaying a second visual representation of the audio data of the audio file. The graphical user interface also includes one or more selection tools for selecting a region within each displayed visual representation. The graphical user interface also includes one or more editing tools for editing a portion of the audio data common to both selected regions of the displayed audio data.

Visual representations of audio data can be simultaneously displayed in multiple forms. For example, audio data representing both frequency and pan position can each be displayed with respect to time. The user can then select regions within each visual representation in order to isolate audio data that correspond to each selected region (i.e., the audio data that satisfies the conditions defined by the selected regions). The isolated audio components are then edited and/or mixed into the audio data.

Particular embodiments of the invention can be implemented to realize one or more of the following advantages. A user can simultaneously view visual representations of audio data in multiple forms. The multiple forms provide flexible editing of the audio data by allowing the user to isolate audio components according to more than one simultaneously-applied audio parameter. Consequently, the user can isolate finely tailored audio data which could not be isolated according to a single audio parameter.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
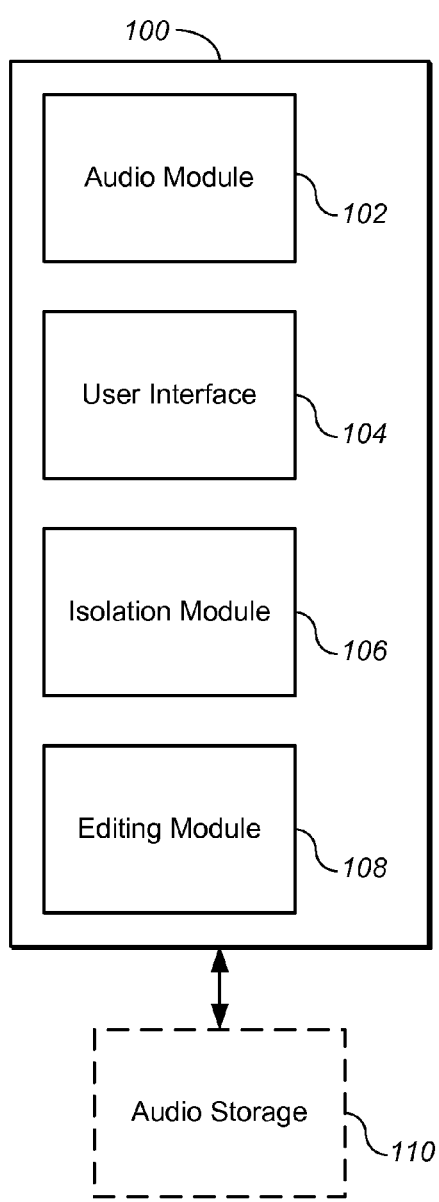
FIG. 1 is a block diagram of an example audio editing system.

FIG. 1 is a block diagram of an example audio editing system 100 for use in performing editing operations on audio data. The audio editing system 100 includes an audio module 102, a user interface 104, an isolation module 106, and an editing module 108.

Audio module 102 analyzes a received audio file and extracts the audio data. Audio files can be received by the audio module 102 from audio storage within the audio system 100, from an external source such as audio storage 110, or otherwise (e.g., from within a data stream, received over a network, or from within a container document, for example, an XML document). The extracted audio data is then represented as visual data and displayed in the user interface 104. The audio module 102 analyzes the audio file to display visual representations the audio data in particular forms, for example, as a frequency spectrogram or pan position graph.

Audio storage 110 can be one or more storage devices, each of which can be locally or remotely located. The audio storage 110 responds to requests from the audio editing system 100 to provide particular audio files to the audio module 102.

The user interface 104 provides a graphical interface for simultaneously displaying visual representations of the audio data in two or more forms. For example, the user interface 104 can display both a frequency spectrogram and a pan position graph representing the same audio data, using information received from the audio module 102. The user interface 104 also allows the user to identify and request a particular audio file. Additionally, the user interface 104 provides various tools and menus that a user can use to interact with the displayed audio data.

In one implementation of the user interface 104, the tools include one or more selection tools allowing the user to select a region of the displayed audio data in each of the visual representations. For example, geometric selection tools, e.g., a rectangle tool, a circle tool, or a tool of another geometric shape, can be positioned and sized within the displayed audio data to select a particular region. The selected region corresponds to a portion of the displayed audio data. Additionally, the user can select a region using drawing tools, e.g., a lasso tool, that allow the user to select an arbitrary portion of the audio data displayed in the user interface 104. For example, the lasso tool can be used to draw a region having any shape the user chooses in the audio data display. In another implementation of the user interface 104, the selection tools include one or more automatic selection tools that can be used to automatically select a region of displayed audio data. For example, an automatic selection tool can select a region of the audio data according to amplitude. Thus, only a region having a threshold amplitude level is selected (e.g., a pan region having audio data of a particular amplitude or a frequency spectrogram region having audio data of a particular amplitude).

The user interface 104 also includes one or more editing tools. The user can use the tools to perform editing operations on isolated audio components. The editing operations are performed on audio components common to each selection region of the audio data. The audio components are isolated, for example, by isolation module 106. For example, the editing tools can perform a number of different editing effects on the isolated components of the audio data.

The isolation module 106 isolates audio data corresponding to the audio components from each portion of the audio data present in the selection regions of each visual representation (i.e., the intersection of the audio data found in each selection region). The isolation module 106 processes the portion of the audio data corresponding to each selection region to identify and isolate the particular audio components common to each portion of the audio data. Once the audio components are isolated from the rest of the displayed audio data, the isolated audio components can be edited.

The editing module 108 can perform editing operations on the isolated audio data. Editing operations can be performed in response to a user input, for example, input provided through user interactions with the user interface 104. Editing operations can include the removal of the isolated audio data from the audio data as well as the processing of the isolated audio data to generate one or more particular effects. For example, audio effects include amplifying, pitch shifting, flanging, reversing, and attenuating. When editing is complete, the edited version of the isolated audio data is mixed with the original audio data to produce an edited version of the displayed audio data.

Figure 2:
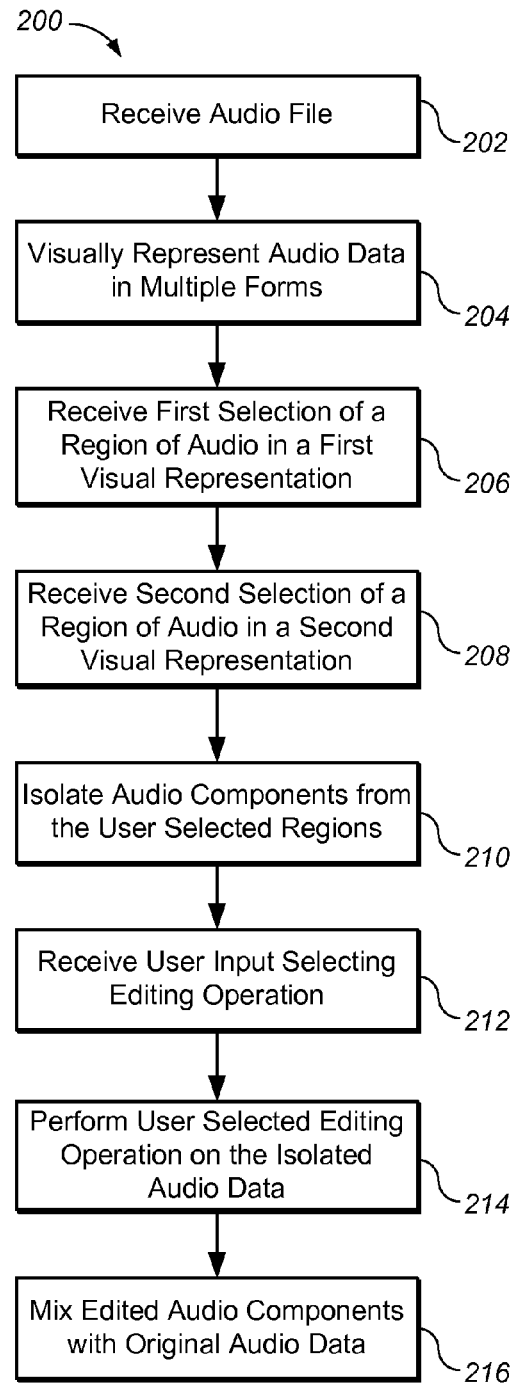
FIG. 2 shows an example process for editing audio data.

FIG. 2 shows an example process 200 for editing audio data. An audio file is received (e.g., from audio storage 110) (step 202). The audio file is received, for example, in response to a user selection of a particular audio file to edit.

Audio data extracted from the audio file is represented and visually displayed in multiple forms (step 204). The audio data is displayed, for example, in a window of a graphical user interface (e.g., user interface 104). The audio data is displayed in a visual representation that illustrates particular features of the audio data. For example, visual representations can include amplitude waveforms, frequency spectrograms, pan position displays, and phase displays.

The user interface can display multiple visual representations of the audio data from the selected audio file simultaneously. For example, the user interface can include regions for comparatively viewing the same audio data in different forms. Additionally, the visual representations can be linked in time such that changes in viewing one visual representation with respect to time automatically produces a corresponding change in the other presented visual representations. For example, the visual representations can have a single time axis such that a user can identify corresponding audio data in the different visual representations for any particular point in time.

Figure 3:
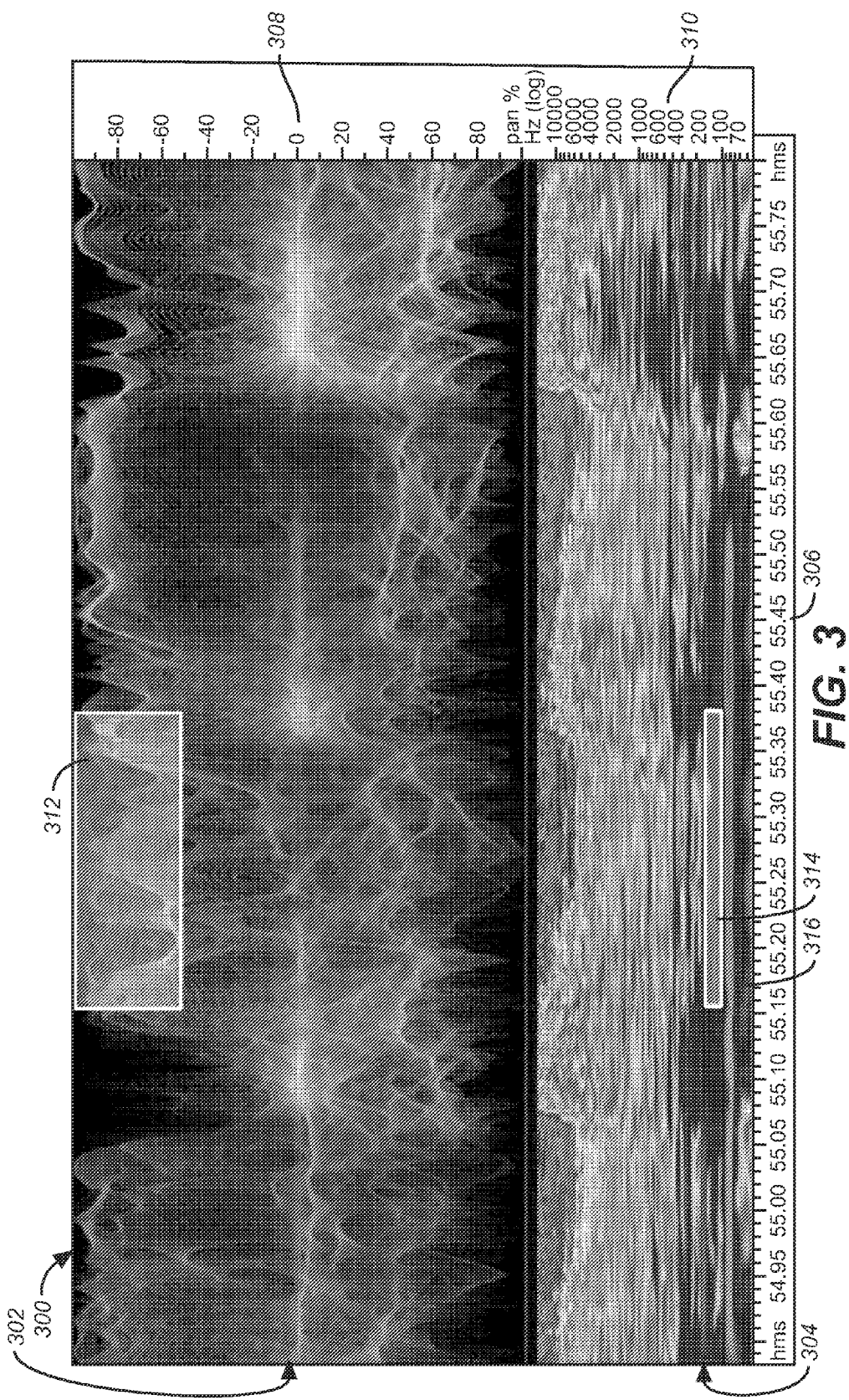
FIG. 3 shows an example display of audio data as both a frequency spectrogram and pan position graph.

As shown in FIG. 3, in one implementation of the user interface, a display 300 can present audio data presented visually as both a pan position graph 302 and a frequency spectrogram 304. Both the pan position graph 302 and frequency spectrogram 304 share the same time range along a horizontal time axis 306.

The pan position graph 302 displays the pan position of audio data in the time-domain. The pan position refers to the spatial position of particular audio data at any given time in terms of relative distance to the left or right of center. For example, an orchestra includes various musical instruments positioned at different spatial positions on a stage. The violins are typically on the left side of the stage, while the cellos are typically on the right side of the stage. The sound from the violins, therefore, originates from a different pan position than the sound from the cellos. Thus, the audio data corresponding to the violins can be distinguished from the audio data corresponding to the cellos according to the pan position of the audio data.

In the pan position graph 302, the displacement axis 308 shows the relative displacement of particular components of the audio data to the right or the left of center as a percentage to the left or right from 0 to 100. Thus, at any particular point in time, the audio data can include multiple different pan positions (e.g., different instruments of the orchestra playing simultaneously from different stage locations). The scale of the displacement axis 308 can be modified, for example by user input, in order to zoom in on a particular range of pan positions (e.g., to zoom in on audio data from just the left). The displayed audio data in the pan position graph 302 is adjusted to correspond to user changes in the scale.

The frequency spectrogram 304 displays the frequency components of the audio data in the time domain. In the frequency spectrogram 304, a frequency axis 310 provides a frequency scale identifying the frequencies of the displayed audio data. The frequency scale can be, for example, a linear, logarithmic (as shown in FIG. 3), or other scale. The scale of the frequency axis 310 can be modified by the user in order to zoom in on a particular frequency range. In one implementation of the frequency spectrogram, separate frequency displays are presented corresponding to audio data from separate audio channels (i.e., separate audio streams of the audio data provided by different recording devices, e.g., separate microphones).

In one implementation of the user interface, the audio data is automatically displayed in default visual representation. Alternatively, the user can identify the particular visual representations to display. In one implementation of the user interface, the audio data is automatically presented as a frequency spectrogram and pan position graph. The user can then use the frequency spectrogram and pan position graph to isolate particular audio components within selected regions according to their time, frequency, and pan position.

The pan position and frequency parameters can be used to identify particular audio data for a given point in time. This is because audio components having a particular time, frequency, and pan position are substantially indistinguishable from one another. Consequently, the remaining process steps are described with reference to a simultaneous display of audio data as a pan position graph and a frequency spectrogram, such as shown in FIG. 3. However, in an alternative implementation, the audio data can be presented in separate displays, which the user can switch between. Additionally, other types of visual representations can be alternatively, or additionally, used to isolate audio components in a similar manner (e.g., amplitude displays, phase displays). Additionally, the user interface can simultaneously present more than two visual representations to the user, allowing the user to isolate audio components of the displayed audio data according to additional audio parameters.

As shown in FIG. 2, after displaying the audio data in multiple forms, a first input is received (e.g., from a user) selecting a region in a first visual representation (e.g., the pan position graph 302) of the displayed audio data (step 206). The user can use a selection tool in the user interface to draw a selection region within the displayed audio data of the first visual representation. For example, a rectangular selection tool can be used to define a rectangular region within the pan position graph with respect to pan position and time. Non-rectangular regions can also be selected including other geometric shapes as well as user shaped regions. For example, the selected region can demarcate a varying pan range over time. The selection region identifies a portion of the audio data displayed.

FIG. 3 shows the example audio display 300 where a user has selected a region 312 in the pan position graph 302. The selected region 312 is a rectangular region defining a particular range of pan positions over a particular time range. Specifically, the selected region 312 corresponds to a portion of the audio data having a pan position substantially 45% to 100% to the left of center. Additionally, the selected region 312 corresponds to a time range from substantially 55.16 ms to 55.38 ms.

The selection region in the pan position graph corresponds to a spatial range for a particular portion of the audio data. Referring again to the example orchestra discussed above, a noise audio component that the user wants to remove can be identified by audio data located at a particular pan location, for example, on the left side of the stage. For example, the noise audio component can correspond to a chair squeak in the second violins section. The user can manually identify the presence of the noise audio component, for example, through visual or audio examination of the audio data. Alternatively, the user can identify noise audio components using an automated audio processing application. Therefore, the user can select, within the pan position graph, a selection region corresponding to a region of the left side of the orchestra where the chair squeak originated.

As shown in FIG. 2, after selecting a region in the first visual representation, a second input is received (e.g., from the user) selecting a region in a second visual representation (e.g., the frequency spectrogram 304) of the displayed audio data (step 208). The user can again use a particular selection tool in the user interface to draw a selection region within the displayed audio data of the second visual representation. For example, the selection tool can be used to define a selection region with respect to frequency and time. The selection region identifies a portion of the audio data displayed in the frequency spectrogram.

In one implementation of the user interface, the user selection in the second visual representation is constrained in time to the time range of the selection region in the first visual representation. However, since only audio data identified in both selection regions is isolated, the user selection in the second visual representation does not necessarily have to match the time frame of the selection region in the first visual representation. Since audio data is required to correspond in time in order to be common to each selection region, selected audio data in one visual representation for time periods where there is not corresponding audio data in the other visual representations is ignored. In one implementation of the user interface, the user selection of a selection region in the first visual representation can trigger a time marker presented in the user interface to provide a guide for the user to make selections within other presented visual representations. One example time marker for visually identifying the time range to provide a reference to the user is shown as marker 316 in FIG. 3.

The example audio display 300 of FIG. 3 also includes a selected region 314 in the frequency spectrogram 304. The selected region 314 is a rectangular region defining a particular range of frequencies over a particular time range. Specifically, the selected region 314 corresponds to a portion of the displayed audio data having a frequency substantially between 100 and 200 Hz. Additionally, the selected region 314 corresponds to the same time range from substantially 55.16 ms to 55.38 ms as the selected region 312 of the pan position graph 302.

Again, referring back to the orchestra example above, the previously discussed chair squeak in the left side of the orchestra has one or more frequencies. Thus, for a user to eliminate the chair squeak from the audio data, without removing other audio data at that pan position, the selected region in the frequency spectrogram should be selected according to the frequencies of the chair squeak.

Audio data present in both user selected regions is isolated (step 210) to provide isolated audio data. Each selection region corresponds to a portion of the original audio data. However, the isolated audio data only includes the audio data represented in both the first and second selection regions.

Various techniques can be used to isolate the portion of the audio data within each selected region. For example, the portion of the audio data corresponding to the selected region in the pan position graph can be isolated using an extraction process that identifies audio data corresponding to a particular pan position and extracts that audio data. Techniques for extracting audio data according to pan position are disclosed in co-pending and commonly owned U.S. patent application Ser. No. 10/989,531, filed on Nov. 16, 2004, entitled "System and Method for Processing Multi-Channel Digital Audio Signals," which is hereby incorporated by reference.

Processing operations can also be performed to isolate the audio data corresponding to the selected region in the frequency spectrogram. In one implementation, one or more filters can be used. For example, to isolate the audio data within a rectangular selection region (i.e., a selection region having audio data corresponding to a constant frequency band), one or more static filters can be applied. The static filters have a particular passband of frequencies selected such that after applying the filters only the audio data having frequencies within the selected region remain. Alternatively, one or more dynamic filters can be used instead, for example, when the audio data corresponding to the selection region has a variable frequency band.

In another alternative implementation of frequency isolation, Fourier transforms can be used instead of filters. For example, a fast Fourier transform ("FFT") can be applied to the audio data in order to isolate frequency components of the audio data corresponding to the selection region at each point in time. Techniques for isolating audio data according to frequency using FFTs are disclosed in co-pending and commonly owned U.S. patent application Ser. No. 11/395,044, filed on Mar. 30, 2006, to David Johnston, entitled "Editing Audio Directly in Frequency Space," which is hereby incorporated by reference.

The isolated audio data from each selection region is then combined to isolate the audio data that is common to all selection regions. Referring again to our example orchestra, the isolation process would isolate the audio data corresponding to the pan position and frequencies of the chair squeak without including other, desirable audio data (e.g., without including audio data from instruments at that pan location having frequencies other than the chair squeak as well as audio data from instruments at other pan locations having the same frequencies as the chair squeak).

The isolated audio data from each selection region can be combined, for example, by applying one or more frequency filters corresponding to the frequencies identified from the isolated audio data in the frequency spectrogram to the isolated audio data of the pan position display. Thus, the audio data isolated by pan position is further isolated according to the isolated frequency audio data. Alternatively, the reverse process can be performed. The isolated audio data from the frequency spectrogram can be separated according to the pan positions identified from the isolated audio data in the pan position display.

In an alternative implementation, the isolated audio data from each selection region can be subtracted from one another, where the eliminated audio data identifies the common audio components from the isolated audio data of each display.

After isolating the audio components that are common to each selection region, the user provides an input selecting one or more editing operations to perform on the isolated audio components (step 212). In one implementation, the user interface includes one or more tools for including editing effects that can be performed on the isolated audio data.

The selection of particular editing effects can generate a dialog box through which the user can provide additional user input parameters to further define the editing effect. For example, a dialog box can be generated to accept user input parameters for setting the duration of a time domain effect (e.g., an echo effect) or a frequency range for a frequency modifying effect (e.g., pitch scaling).

The user selected editing operations are performed on the isolated audio data (step 214). Effects that can be performed on the isolated audio data include, for example, amplifying, pitch shifting, flanging, echo, reversing, and attenuating. For example, a pitch shifting effect can be applied to adjust the pitch of the audio data within the isolated region without modifying the time associated with the audio data. A flanging effect is a time domain effect that applies an audio signal identical to the isolated audio data, except that the applied signal is time delayed by a small amount (e.g., 10 ms).

Additionally, the editing operation can include the removal of the isolated audio data, for example, the removal of the particular audio data corresponding to the chair squeak in our example orchestra above. Thus, the edited audio components are equivalent to the isolated audio components.

As shown in FIG. 2, the edited audio components are then mixed into the original displayed audio data to form an edited version of the original audio data (step 216). In one implementation, to mix the edited portions of the audio data back into the original audio data, the portion of the audio data from the selected region is first subtracted from the original audio data. This can be done contemporaneously with the isolation of the selection region or can be done at any time prior to mixing the edited audio data back into the original audio data. Subtracting the portion of the audio data from the selected region can include directly subtracting the sample point values of the audio data of the selected region from the sample point values of the original audio data in the time-domain.

After subtracting the portion of the audio data corresponding to the selected regions of the original audio data, the edited audio data are then mixed into the remaining original audio data to create a single edited version of the audio data. Mixing the original audio data and the edited audio data can be performed by directly summing the sample point values in the time-domain.

Alternatively, the subtraction of the isolated audio components can be the desired editing effect (e.g., performing an edit to remove unwanted noise components of the audio data). Thus, the subtraction of the isolated audio data from the audio data completes the mixing process and provides the edited effect of removing the isolated audio components from the original audio data.

The user can select and edit additional selection regions within the displayed audio data. The additional selection regions are processed and edited in the manner described above. Once the user has completed editing, the user can save the edited audio file and store it for playback, transmission, or other uses.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
   displaying original audio data in a plurality of visual forms;
   receiving a first selection of a region within a first visual representation of the original audio data;
   receiving a second selection of a region within a second visual representation of the original audio data;
   isolating audio components from the selected regions to provide isolated audio data, the isolated audio data corresponding to audio data common to both user selected regions;

editing, using one or more computing devices, the isolated audio data; and mixing the edited audio data into the original audio data.

2. The method of claim 1, where displaying the original audio data includes displaying a frequency spectrogram and displaying a pan position graph.

3. The method of claim 1, where receiving a selection of a region includes receiving a user input demarcating a region using a selection tool.

4. The method of claim 1, where isolating audio components includes:
  isolating a portion of the audio data corresponding to each selected region; and
  identifying the audio components common to each isolated portion of the audio data.

5. The method of claim 1, where isolating audio components includes isolating audio data corresponding to a particular time, frequency, and pan position.

6. The method of claim 1, where displaying the original audio data includes receiving a user input selecting one or more visual forms for displaying the original audio data.

7. The method of claim 1, where editing the isolated audio data includes identifying the isolated audio data for removal from the original audio data.

8. The method of claim 1, where mixing the edited audio data and the original audio data includes subtracting the isolated audio data from the original audio data.

9. A computer program product, encoded on a computer-readable medium, operable to cause data processing apparatus to perform operations comprising:
  displaying original audio data in a plurality of visual forms;
  receiving a first selection of a region within a first visual representation of the original audio data;
  receiving a second selection of a region within a second visual representation of the original audio data;
  isolating audio components from the selected regions to provide isolated audio data, the isolated audio data corresponding to audio data common to both user selected regions;
  editing the isolated audio data; and
  mixing the edited audio data into the original audio data.

10. The computer program product of claim 9, where displaying the original audio data includes displaying a frequency spectrogram and displaying a pan position graph.

11. The computer program product of claim 9, where receiving a selection of a region includes receiving a user input demarcating a region using a selection tool.

12. The computer program product of claim 9, where isolating audio components includes:
  isolating a portion of the audio data corresponding to each selected region; and
  identifying the audio components common to each isolated portion of the audio data.

13. The computer program product of claim 9, where isolating audio components includes isolating audio data corresponding to a particular time, frequency, and pan position.

14. The computer program product of claim 9, where displaying the original audio data includes receiving a user input selecting one or more visual forms for displaying the original audio data.

15. The computer program product of claim 9, where editing the isolated audio data includes identifying the isolated audio data for removal from the original audio data.

16. The computer program product of claim 9, where mixing the edited audio data and the original audio data includes subtracting the isolated audio data from the original audio data.

17. A system, comprising:
  one or more computing devices operable to perform operations including:
  displaying original audio data in a plurality of visual forms;
  receiving a first selection of a region within a first visual representation of the original audio data;
  receiving a second selection of a region within a second visual representation of the original audio data;
  means for isolating audio components from the selected regions to provide isolated audio data, the isolated audio data corresponding to audio data common to both user selected regions;
  means for editing the isolated audio data; and
  means for mixing the edited audio data into the original audio data.

18. A system, comprising:
  one or more computing devices operable to generate a graphical user interface configured to present:
  a first display region for displaying a first visual representation of audio data of an audio file;
  a second display region for displaying a second visual representation of the audio data of the audio file;
  one or more selection tools for selecting a region within each displayed visual representation; and
  one or more editing tools for editing a portion of the audio data common to both selected regions of the displayed audio data.

* * * * *